United States Patent
Itagaki (10) Patent No.: US 12,470,992 B2
(45) Date of Patent: Nov. 11, 2025

(54) NETWORK OPERATING SYSTEM AND NETWORK MANAGEMENT METHOD

(71) Applicant: RAKUTEN MOBILE, INC., Tokyo (JP)

(72) Inventor: Tsuyoshi Itagaki, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 420 days.

(21) Appl. No.: 17/802,138

(22) PCT Filed: Feb. 26, 2021

(86) PCT No.: PCT/JP2021/007558
§ 371 (c)(1),
(2) Date: Aug. 25, 2022

(87) PCT Pub. No.: WO2022/180849
PCT Pub. Date: Sep. 1, 2022

(65) Prior Publication Data
US 2023/0180087 A1    Jun. 8, 2023

(51) Int. Cl.
*H04W 36/22*   (2009.01)
*H04W 36/12*   (2009.01)
*H04W 36/32*   (2009.01)

(52) U.S. Cl.
CPC .......... *H04W 36/22* (2013.01); *H04W 36/12* (2013.01); *H04W 36/322* (2023.05)

(58) Field of Classification Search
CPC ... H04W 36/22; H04W 36/12; H04W 36/322; H04W 36/00838; H04W 36/13; H04W 36/30; H04W 36/0016
See application file for complete search history.

(56) References Cited

U.S. PATENT DOCUMENTS

| | | | |
|---|---|---|---|
| 9,526,024 B2* | 12/2016 | Forte | H04L 63/1408 |
| 2015/0271727 A1 | 9/2015 | Harrang | |
| 2016/0330077 A1 | 11/2016 | Jin et al. | |
| 2019/0223236 A1* | 7/2019 | Sebastian | H04L 12/4625 |
| 2020/0367109 A1* | 11/2020 | Chen | H04W 28/18 |
| 2021/0204162 A1* | 7/2021 | Chunduri | H04L 41/40 |
| 2021/0314839 A1* | 10/2021 | Çetinkaya | H04W 4/027 |

FOREIGN PATENT DOCUMENTS

| | | |
|---|---|---|
| JP | 2013172407 A | 9/2013 |
| WO | 2019167474 A1 | 9/2019 |

OTHER PUBLICATIONS

Shingo Enami et al, Research on analysis prediction technology of human flow and traffic flow considering microscale and macroscale mobility, The Institute of Electronics Information and Communication Engineers, Feb. 22, 2018, vol. 117, No. 459, pp. 265-268, 6pp.

* cited by examiner

*Primary Examiner* — Luat Phung
(74) *Attorney, Agent, or Firm* — HAUPTMAN HAM, LLP (57) ABSTRACT

In a network operating system, a consumed resource manager of a slicing control device manages a resource consumed by a base station. A terminal information manager manages a type of terminal and a service in use. A cell manager manages cell information and creates a neighbor cell list. A movement information acquirer acquires movement information suggesting motion of a terminal. A motion predictor predicts, on the basis of the movement information, a future position or motion of the terminal. A resource controller and sets aside the resource in advance.

20 Claims, 10 Drawing Sheets

NETWORK OPERATING SYSTEM AND NETWORK MANAGEMENT METHOD

RELATED APPLICATIONS

The present application is a National Phase of International Application Number PCT/JP2021/007558, filed Feb. 26, 2021.

TECHNICAL FIELD

The present invention relates to a network operating system and a network management method for implementing mobile communications.

BACKGROUND ART

A fifth generation mobile communication system (5G) has been introduced as a mobile communication system for digital transformation. In 5G, three scenarios of enhanced mobile broadband (eMBB), massive machine type communications (mMTC), and ultra-reliable and low latency communications (URLLC) are expected. In order to implement such scenarios, network slicing that divides a common physical infrastructure into logical units and guarantees, for each logical unit, a quality of service (QoS) tailored to a corresponding type of terminal or service to be provided is performed.

SUMMARY OF INVENTION

Technical Problem

The network slicing technology is based on sharing a resource allocated to a network slice among a group of terminals using the same type of service. On the other hand, for mobile communications, it is necessary to take an imbalance in demand for resources or changes in demand with time into consideration for distribution of base stations serving as the entrance of the network slice. For example, it is conceivable that the quality of communications or service will fail to be maintained unless resources are suitably allocated to each base station in response to a change such as sudden concentration or dispersion of terminals.

The present invention has been made in view of such problems, and it is therefore an object of the present invention to provide a technology of maintaining a network in excellent condition against movement of terminals or a change in distribution of terminals.

Solution to Problem

An aspect of the present invention relates to a network operating system. The network operating system is a system for controlling a virtual network over which mobile communications are implemented, the network operating system including a motion predictor structured to predict motion of a terminal on the basis of movement information suggesting the motion, and a resource controller structured to control a resource allocation to a radio base station on the virtual network in accordance with a result of predicting the motion.

Another aspect of the present invention relates to a network management method. The network management method is applied to a system for controlling a virtual network over which mobile communications are implemented, the network control method including predicting motion of a terminal on the basis of movement information suggesting the motion; and controlling a resource allocation to a radio base station on the virtual network in accordance with a result of predicting the motion.

Note that any combination of the above-described components, or an entity that results from replacing expressions of the present invention among a method, a device, a system, a computer program, a recording medium storing a computer program, and the like is also valid as an aspect of the present invention.

Advantageous Effects of Invention

According to the present invention, the network can be maintained in excellent condition against movement of terminals or a change in distribution of terminals.

DESCRIPTION OF EMBODIMENTS

Figure 1:
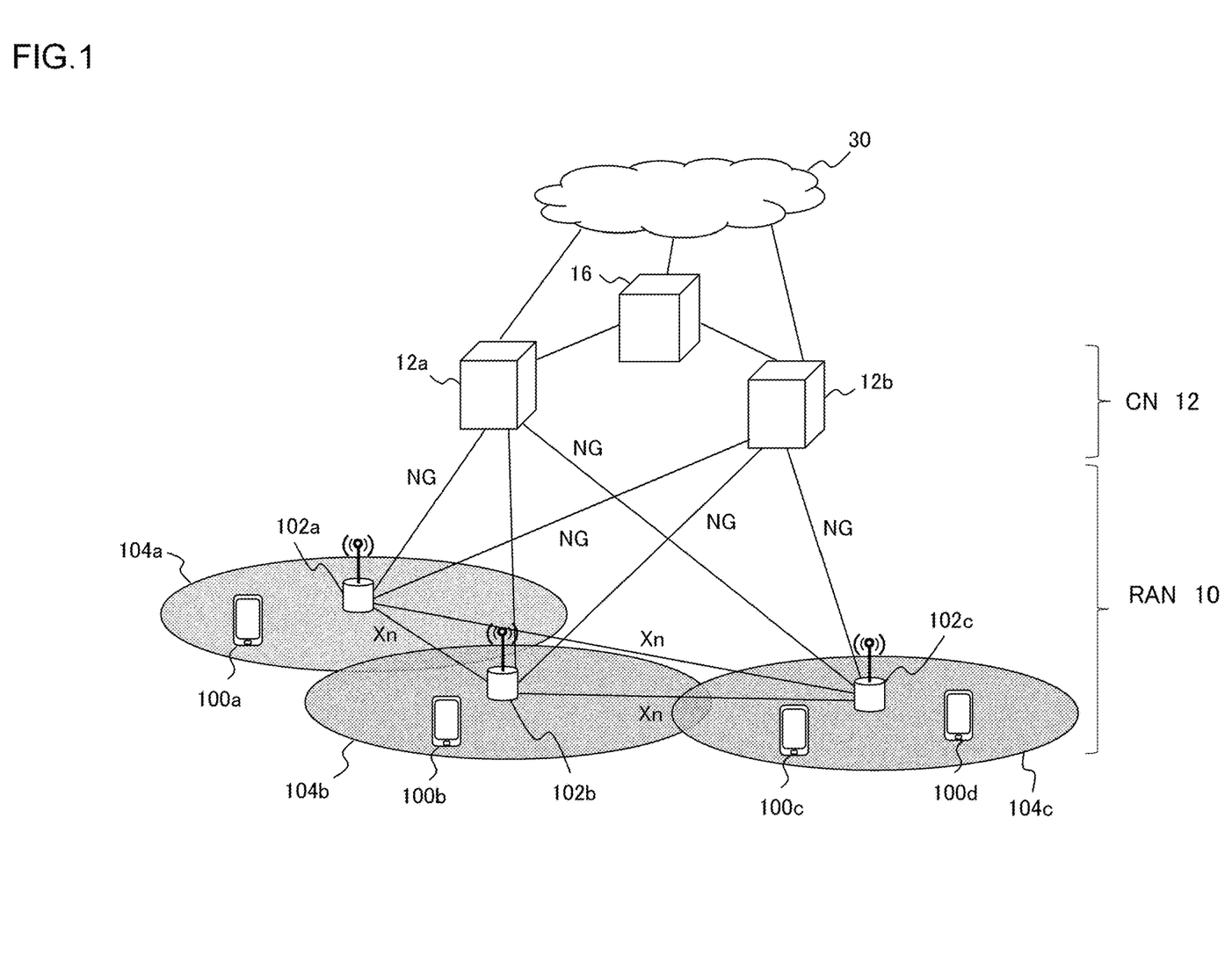
FIG. 1 is a diagram illustrating a basic configuration of a communication network implemented according to the present embodiment.

FIG. 1 illustrates a basic configuration of a communication network implemented according to the present embodiment. The communication network includes a radio access network (RAN) 10, a core network (CN) 12, and a network operating system 16. The RAN 10 includes a plurality of radio base stations 102*a*, 102*b*, and 102*c* responsible for management of radio resources, management of QoS, data compression, data encryption, and the like.

Note that the RAN 10 may further include a relay node or the like. The radio base stations 102*a*, 102*b*, 102*c* each includes an antenna that transmits and receives radio waves to and from terminals 100*a*, 100*b*, 100*c*, 100*d*, a baseband device that processes signals and transmits and receives data to and from the CN 12, and the like. Hereinafter, the terminals 100*a*, 100*b*, 100*c*, 100*d* are collectively referred to as a terminal 100, and the radio base stations 102a, 102b, 102c are collectively referred to as a base station 102.

The CN 12 includes a server or the like (for example, CNs 12a, 12b) installed at one or more sites, and includes a user plane for transferring user data transmitted and received by the terminal 100, and a control plane for controlling a corresponding communication channel. The user plane is connected to an external network 30 such as the Internet and relays data communications between the base station 102 and the network 30. The user plane is composed of a user plane function (UPF) or the like in 5G.

The control plane is responsible for connection processing on the terminal 100, handover control for switching to the base station 102 to be used, session management of the user plane, and the like. In 5G, the control plane is composed of an access and mobility management function (AMF), a session management function (SMF), unified data management (UDM), and the like. Communications between the base station 102 and the CN 12 are performed via an NG interface. Communications between the base stations 102 are performed via an Xn interface.

The network operating system 16 is a device or a group of devices that constructs a virtual network, that is, the functions of the RAN 10 and the CN 12, on hardware and controls the virtual network. A specification of a technology of network functions virtualization (NFV) for virtualizing hardware resources via a virtual machine implemented on a virtualization layer to implement a network service is defined by European Telecommunications Standards Institute (ETSI). The NFV allows a network function to be implemented without installing a physical dedicated device and thus allows a reduction in cost of installation and operation of equipment.

The architecture of management and orchestration (MANO) responsible for integrated management and optimization of network services and resources in the NFV is applicable to the network operating system 16 of the present embodiment. Note that the architecture is not particularly limited as long as a network slicing control function (to be described later) is available. Further, the configuration of the communication network thus illustrated is merely an example, and the number and arrangement of the base stations 102, the CNs 12, the network operating system 16, and the various types of interfaces, and how such components are grouped are not particularly limited.

For example, at least some of the functions of the network operating system 16 may be installed at the same site as at least some of the CNs 12. Alternatively, multi-access edge computing (MEC) may be implemented by installing at least some of the functions of the network operating system 16 in the base station 102 or at a site close to the base station 102. For example, in order to make a resource allocation and the like faster, the network slicing control function (to be described later) may be installed in or near the base station 102.

Figure 2:
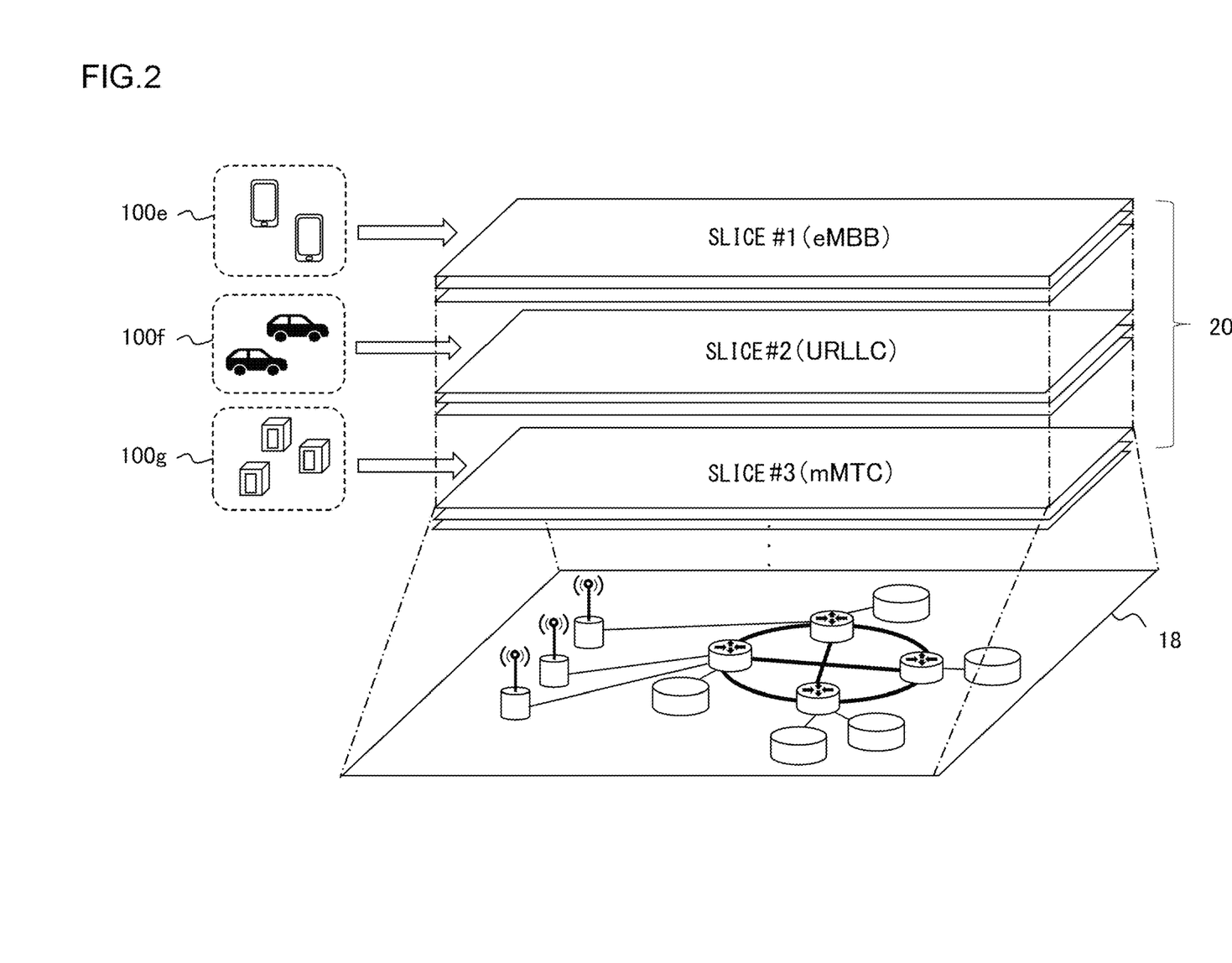
FIG. 2 is a diagram illustrating a concept of network slices provided for different types of terminals.

In the example illustrated in FIG. 1, the terminal 100 is illustrated as a smartphone, but any device capable of performing radio communications may be used as the terminal 100. FIG. 2 illustrates a concept of network slices provided for different types of terminals 100. A network slice 20 corresponds to a virtual network that is composed of resources obtained by logically dividing a physical infrastructure 18 and includes the functions of the RAN 10 and the CN 12.

In the illustrated example, each of the network slices 20 is represented by a plane, and the network slices 20 are roughly divided into types as a "slice #1", a "slice #2", and a "slice #3". The slice #1 is a network slice for eMBB, and transmits and receives large-capacity data at high speed. This allows a service such as distribution of high-definition video such as 8 K or game distribution to be provided to a terminal 100e such as a smartphone, a game console, or a tablet terminal.

The slice #2 is a network slice for URLLC, and transmits and receives data with low latency, and with high reliability and availability. This allows autonomous driving or remote control to be performed with high accuracy using a terminal 100f such as an automobile, a drone, or a robot. The slice #3 is a network slice for mMTC, and is connected to a large number of devices in diverse environments to transmit data with a small processing load. For example, a smart appliance, various types of sensors, or the like can be used as a terminal 100g for monitoring, appliance control, or the like.

As described above, constructing a plurality of types of network slices in accordance with the nature of services to be implemented via communications allows various types of services to be implemented with the minimum influence on other services and with the best performance for each type. A technology of automatically performing provisioning and life-cycle management for each network slice such as a resource allocation by a software defined networking (SDN) controller or an orchestrator has been realized.

To maximize the effect of network slice, it is important to introduce end-to-end integrated control so as to cause all data channels, that is, the RAN 10, the CN 12, a data center that provides a service (e.g., an application server), and a transport network between them to operate under a common policy. In order to implement the end-to-end integrated control, the network operating system 16 functions as an end-to-end (E2E) orchestrator.

Figure 3:
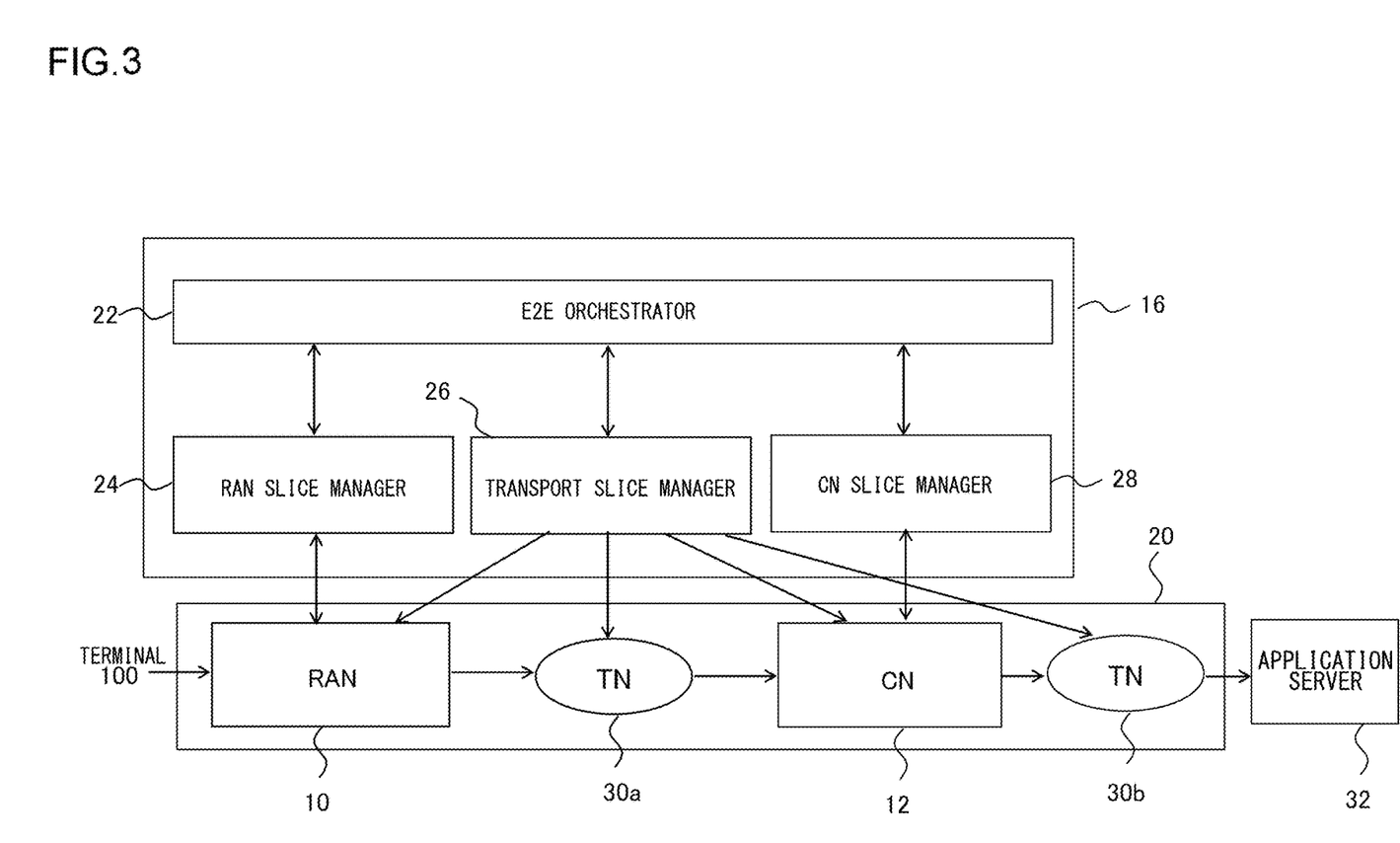
FIG. 3 is a diagram illustrating a network slice resource management mechanism applied to a network operating system according to the present embodiment.

The E2E orchestrator may also be implemented on the basis of the MANO architecture described above. In present embodiment, attention is particularly paid to a function of making an adjustment to the resources of the network slices once constructed in a manner that depends on an actual condition. FIG. 3 illustrates a network slice resource control mechanism applied to the network operating system 16. Note that the lower part of FIG. 3 illustrates a certain network slice 20, and the terminal 100 and the application server 32 are connected end to end by the RAN 10, transport networks (TNs) 30a, 30b, and the CN 12.

The network operating system 16 includes an E2E orchestrator 22, a RAN slice manager 24, a transport slice manager 26, and a CN slice manager 28. The E2E orchestrator 22 is responsible for controlling the provisioning, management, and monitoring of network slices. The RAN slice manager 24 is responsible for optimizing the allocation of radio resource blocks and waveforms for each network slice. The transport slice manager 26 is responsible for optimizing the configurations of the TNs 30a, 30b (and transport networks inside the RAN 10 and the CN 12) for each slice with a topology optimized to make latency low.

Similarly, the CN slice manager 28 is responsible for optimizing the configuration of the CN 12 with an optimized topology. The E2E orchestrator 22, the RAN slice manager 24, the transport slice manager 26, and the CN slice manager 28 cooperate with each other to collect various types of data on the network service to know a communication condition, analyze the actual condition of the entire network slice, and change the configuration, as necessary. This allows, even when the condition variously changes, a requirement for each service to be kept satisfied.

Here, the RAN 10 of one network slice 20 may include a plurality of base stations 102 in a manner that depends on the distribution and movement range of users who use the terminals 100. Each base station 102 may be occupied by a certain network slice or may be shared by a plurality of network slices. In any case, a user who uses a certain service connects his/her own terminal 100 to a neighboring base station 102 to establish communications with the application server 32 via a network slice 20 shared with a user who uses another base station, and uses the service.

For example, the terminal 100 shares identification information on a network slice with the CN 12 and establishes a protocol data unit (PDU) session with the UPF. The PDU session from the terminal 100 is transferred to a virtual local area network (VLAN) on the network slice 20 by the base station 102, and is transferred to the application server 32 via the optimized TNs 30a, 30b, and the CN 12.

Figure 4:
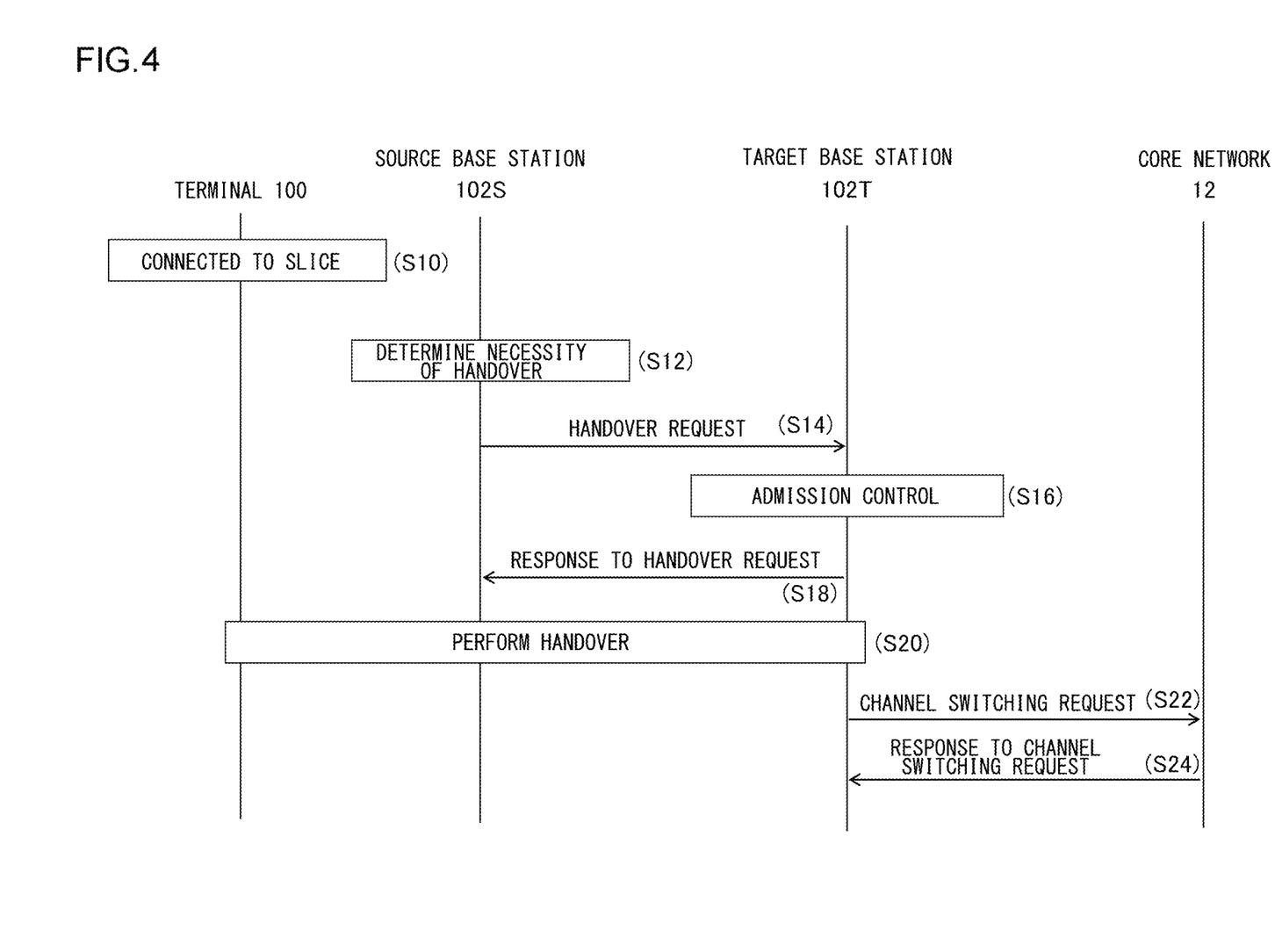
FIG. 4 is a diagram illustrating an inter-cell handover procedure applicable to the present embodiment.

Here, when the terminal 100 moves and detects another base station 102 from which a signal of higher quality even on the same network slice can be received, an inter-cell handover for switching the connection destination to the base station 102 is performed. FIG. 4 illustrates an inter-cell handover procedure. Here, the base station 102 to which the terminal 100 is connected before the handover is referred to as a source base station 102S, and the base station 102 to which the terminal 100 is connected after the handover is referred to as a target base station 102T.

The source base station 102S and the target base station 102T each hold information on a corresponding cell that is a radio coverage of the base station with the information associated with identification information on a corresponding network slice. The identification information on the slice is associated with information such as the type of service and a corresponding CN 12. First, the terminal 100 is connected to the network slice 20 corresponding to the type of the terminal and the service in use via the source base station 102S (S10). At the same time, the terminal 100 performs scanning for measuring a signal quality of a neighboring cell and gives the result to the source base station 102S.

A list of cells to be measured (neighbor cell list) is transmitted from the source base station 102S to the terminal 100. The source base station 102S determines the necessity of a handover and the target base station 102T on the basis of the scanning result (S12). Then, the source base station 102S transmits a handover request to the target base station 102T via the interface Xn (S14). The handover request contains identification information on a session for which a handover is requested and identification information on a network slice corresponding to the session.

In response to the handover request, the target base station 102T performs admission control on the basis of the network slice (S16). Then, the target base station 102T returns a response to the source base station 102S together with information indicating whether the target base station 102T can handle the requested session (S18). Specifically, the target base station 102T determines that the session can be handled when the session is either a session associated with identification information on the network slice supported by itself or a session that allows a resource to be allocated to the network slice. Any session other than the above cannot be handled.

Accordingly, the terminal 100, the source base station 102S, and the target base station 102T perform a handover (S20). Specifically, the source base station 102S transmits, to the terminal 100, a handover command containing a handover-allowed session, a data flow, identification information on a bearer, and the like. Upon receipt of the handover command, the terminal 100 transmits a handover acknowledgement response message to the target base station 102T.

Subsequently, the target base station 102T transmits a channel switching request to the CN 12 (S22). The channel switching request contains the identification information on the session to be accepted by the target base station 102T. This causes the CN 12 to perform channel switching processing on the session and transmit a response message to the target base station 102T (S24). The message contains the identification information on the session for which channel switching has succeeded.

Note that this processing procedure is based on a case where an interface is provided between the source base station 102S and the target base station 102T. When no interface is provided, the CN 12 relays signals between the two. In any case, in the inter-cell handover procedure as illustrated in FIG. 4, switching to the base station 102 of the connection destination is performed on the basis of a real-time positional relationship between the terminal 100 and the cell.

With the above-described mechanism, when radio resources become tight due to, for example, an increase in the number of terminals 100 in a cell of a certain base station 102, it may take time for the E2E orchestrator 22 to acquire information on the tightness and allocate a new resource by controlling the RAN slice manager 24. Further, such a resource shortage may force a connection to be made to another base station 102 on the same network slice 20.

For example, when an event is held or a disaster occurs, a large number of people are likely to gather in one place. Further, during the rush hours, a change with time such as a case where a crowded place moves from a suburb to a downtown is likely to occur. In such a case, the RAN 10 becomes a bottleneck due to the concentration of the terminals 100, which may cause difficulty in connecting to the network or deteriorate the quality of service.

Therefore, according to the present embodiment, various pieces of information suggesting future motion of the terminal 100 are collected, and the optimal configuration of the network slice is predetermined on the basis of the information thus collected. Typically, a movement destination and a time of arrival of a certain terminal 100 are predicted, and a radio resource to be allocated to the base station 102 of a corresponding cell is set aside in advance. Then, when a part of the processing necessary for switching between base stations, such as an adjustment to a resource allocation, is performed before a handover by scanning as illustrated in FIG. 4, that is, before the terminal 100 enters a new cell, the time required for the actual switching processing can be made shorter.

Further, it is possible to reduce the possibility of a case where it is necessary to use a distant base station due to a resource shortage. Although the resource of the network slice to which an adjustment is made according to the present embodiment is not limited to a radio resource, the following description will be given mainly on the basis of an aspect of adjusting a radio resource allocated to a base station. Further, as described above, the terminal 100 of the present embodiment may be of any type, but the following description will be given particularly on the assumption that the terminal 100 is a terminal carried by a user such as a smartphone.

Figure 5:
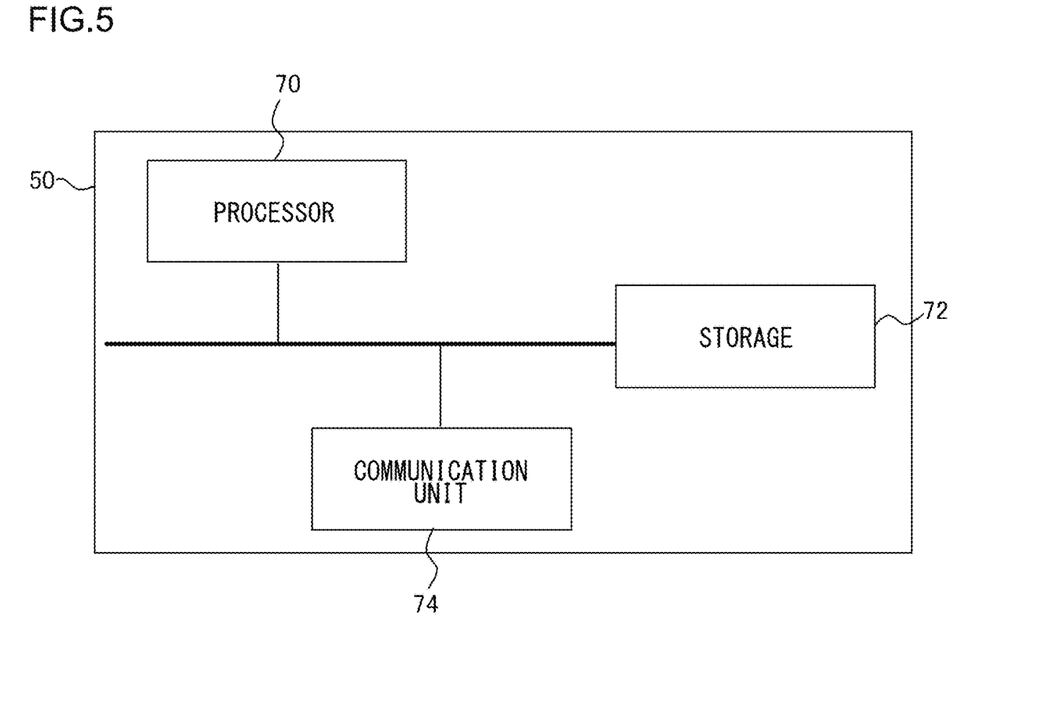
FIG. 5 is a diagram illustrating a circuit structure of a slicing control device according to the present embodiment.

FIG. 5 illustrates a circuit structure of a slicing control device of the present embodiment. A slicing control device 50 is, for example, a part of the network operating system 16, and includes a processor 70, a storage 72, and a communication unit 74. The processor 70 is a program control device such as a microprocessor that runs in accordance with a program. The storage 72 is, for example, a memory device such as a read only memory (ROM) or a random access memory (RAM), a solid state drive (SSD), a hard disk drive (HDD), or the like. The storage 72 stores the program to be executed by the processor 70, and the like.

The communication unit 74 is, for example, a communication interface such as a network interface card (NIC) or a wireless LAN module. The communication unit 74 transmits and receives data to and from the RAN 10 and the CN 12 over a network or the like. The communication unit 74 also retrieves information suggesting motion of the terminal 100 from the application server 32, a server that provides various kinds of information, or the like over the network 30 or the like. Note that the slicing control device 50 may be made up of a plurality of devices that have the same circuit structure and establish communication connections with each other by radio or wire.

For example, at least a part of the slicing control device 50 may be installed in the RAN 10 or the CN 12. Alternatively, the MEC described above may be implemented by installing at least a part of the slicing control device 50 in or near a base station. Slicing control devices 50 having the same structure may be each provided for a corresponding network slice type, and some of the slicing control devices 50 may implement the MEC.

Figure 6:
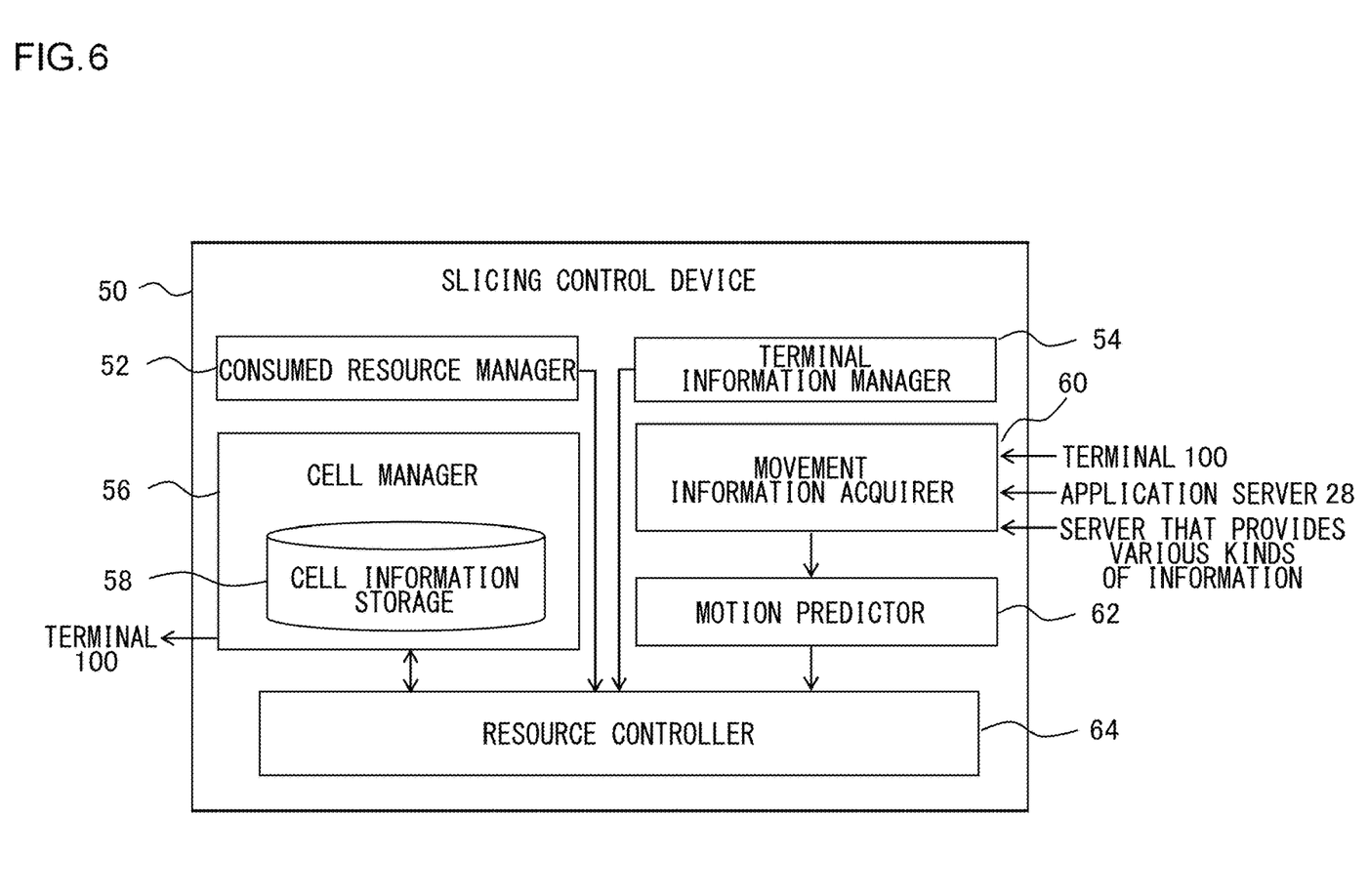
FIG. 6 is a diagram illustrating a configuration of functional blocks of the slicing control device according to the present embodiment.

FIG. 6 illustrates a configuration of functional blocks of the slicing control device 50. Each functional block illustrated in FIG. 6 may be implemented, in terms of hardware, via electronic components such as the processor and the storage illustrated in FIG. 5 and implemented, in terms of software, via a program that is stored in the storage and provides various functions such as a data input/output function, a data retaining function, a computation function, and a communication function. Therefore, it is to be understood by those skilled in the art that these functional blocks may be implemented in various forms such as hardware only, software only, or a combination of hardware and software, and how to implement the functional blocks is not limited to any one of the above.

The slicing control device 50 includes a consumed resource manager 52 that manages a radio resource consumed by the base station 102, a terminal information manager 54 that manages information on the terminal 100, a cell manager 56 that manages cell information for each base station 102, a movement information acquirer 60 that acquires predetermined information suggesting motion of the terminal 100, a motion predictor 62 that predicts the motion of the terminal 100, and a resource controller 64 that controls a network slice resource allocation on the basis of the predicted motion.

The consumed resource manager 52 acquires and manages a radio resource amount consumed by each base station 102. The consumed resource amount can be approximately calculated from a consumed resource amount for each terminal 100 and the number of terminals 100 in a cell, so that the consumed resource manager 52 may manage the number of terminals 100 in a cell for each base station 102 instead of the consumed resource amount.

The cell manager 56 includes a cell information storage 58 that stores cell information such as a positional relationship between the base stations 102 and a range of a cell covered by each base station 102. The cell manager 56 creates a neighbor cell list from the cell information, and transmits the neighbor cell list to the terminal 100 via the base station 102. This allows the cell manager 56 to specifically determine a base station 102 to which the terminal 100 should connect next. Here, the base station 102 to which the terminal 100 should connect next may be determined by the resource controller 64 or the like on the basis of the result of predicting the motion of the terminal 100.

The terminal information manager 54 manages the type of the terminal 100 and a service in use by the terminal 100. The resource controller 64 uses such pieces of information to identify a network slice to be adjusted on the basis of the predicted motion of the terminal 100. The movement information acquirer 60 acquires information (hereinafter referred to as "movement information") suggesting the motion of the terminal 100. For example, the movement information acquirer 60 acquires a movement direction and velocity by periodically acquiring position information for each terminal 100 using a global positioning system (GPS) or an assisted GPS (A-GPS).

Collating such pieces of information with a railroad map or a timetable acquired in advance makes it possible to identify a route the user carrying the terminal 100 is on and an estimated time of arrival at each station. The motion predictor 62 predicts, as described above, the position and motion of the terminal 100 at a subsequent time on the basis of the movement information acquired by the movement information acquirer 60. In other words, the type of the movement information acquired by the movement information acquirer 60 is not particularly limited as long as the motion predictor 62 can predict future motion of the terminal 100.

Examples of the movement information acquired by the movement information acquirer 60 and a method for predicting motion using the movement information performed by the motion predictor 62 are as follows:

1. Position information on the terminal 100 in real time, a map or railroad map of a corresponding area, and meta data attached to the map or railroad map
   a means of transportation is estimated on the basis of a result of collation with the railroad map or a category of a place indicated in the metadata of the map, and a get-off place and a time of arrival at a destination are estimated, information registered by the user may be used for the get-off place or the destination;
2. Details of a reservation of public transportation made by the user using the terminal 100
   an arrival place and an estimated time of arrival of reserved public transportation are acquired;
3. Details of retrieval of information on a means of transportation
   the destination and the time of arrival are estimated on the basis of details of input made by the user or a result of retrieving information on a means of transportation to the destination;
4. Position information on the terminal 100 in real time and details of input to an application provided by a store or facility of the destination
   a destination or a route is determined on the basis of input indicating that the user goes to the store or facility;
5. Registration information on a mobile object such as a drone on which the terminal 100 is mounted
   a destination and a time of arrival are determined on the basis of registration information such as a flight plan; and
6. Information for general use, such as weather information, disaster information, traffic information, information on incidents or accidents, or event information
   a route or a means of transportation by which people as a group are likely to move, a place where people tend to stay, or the like is predicted on the basis of a result of collation with a map or the like.

As described above, the movement information acquirer 60 acquires the movement information that can be acquired from at least one of the terminal 100 itself, the application server 32 in use by the terminal 100 or used by the terminal 100 in the past, a server that provides information on a place such as a map or a railroad map, a server that provides various kinds of news or information, or the like. That is, the "movement information" may be information on a schedule, an action, a service in use, or the like of an individual user who uses the terminal 100, or may be any general information that may cause people to move or stay. Therefore, a source from which the movement information is acquired is not particularly limited.

The motion predictor 62 predicts the motion of the terminal 100 using an algorithm depending on the acquired movement information. The movement information used for the motion prediction may be of one type or a combination of a plurality of types. Further, the motion predictor 62 may continuously predict the movement route of the terminal 100, or may predict the time of arrival at a certain point or a plurality of discrete points. The motion predictor 62 may include artificial intelligence that predicts the motion of the terminal 100 using the movement information as input data. In this case, the motion predictor 62 includes a trained model storage (not illustrated) that stores a trained model obtained through machine learning.

The resource controller 64 includes, for example, the resource control mechanism illustrated in FIG. 3. Then, the resource controller 64 estimates, on the basis of the motion of the terminal 100 predicted by the motion predictor 62, the resource amount for future use, and optimizes the network slice on the basis of the estimated resource amount. Specifically, the resource controller 64 estimates, for each base station 102, the resource amount for future use on the basis of the consumed resource amount for each base station 102, managed by the consumed resource manager 52, and the motion of the terminal 100 predicted by the motion predictor 62.

When the base station 102 is allocated to a plurality of network slices, the resource controller 64 estimates a resource allocation suitable for each network slice. Note that which cell the terminal 100 enters based on the predicted motion can be determined on the basis of the information from the cell manager 56. Further, the network slice in use by the terminal 100 can be identified on the basis of the information from the terminal information manager 54. Then, the resource controller 64 sets aside an additional resource for the base station predicted to have a resource shortage, before an actual resource shortage occurs.

Here, the "setting aside" of a resource is at least one of processing of actually adding a resource allocation using the mechanism illustrated in FIG. 3 or processing of setting aside (reserving) a resource on data so as to prevent resources to be allocated from being reduced during adjustment. Further, the resource controller 64 may perform, before the terminal 100 is connected to the base station 102 of the movement destination, a part of a procedure necessary for the connection other than the setting aside of a resource.

A procedure of making an actual connection to the base station 102 of the movement destination and switching the communication channel may be the same as the handover illustrated in FIG. 4. In this case, the cell manager 56 may add the cell of the base station 102 identified as the movement destination to the neighbor cell list.

Alternatively, the terminal 100 may be connected to the base station 102 of the movement destination using the position information on the terminal 100 acquired by the movement information acquirer 60 when the terminal 100 enters the cell of the base station 102 or enters a predetermined range from the cell. In this case, for example, the cell manager 56 may transmit, to the base station 102, a request equivalent to the handover request in S14 of FIG. 4.

The base station 102 returns a response equivalent to the response in S18 to the source base station to which the terminal 100 has been connected, so that a connection to the base station 102 of the movement destination can be made by processing the same as illustrated in FIG. 4. Note that, when the number of terminals 100 present in the cell is predicted to decrease, the resource controller 64 may make an adjustment so as to free the resource allocated to the base station for a corresponding network slice. This allows a resource to be quickly allocated to another base station having a resource shortage.

Figure 7:
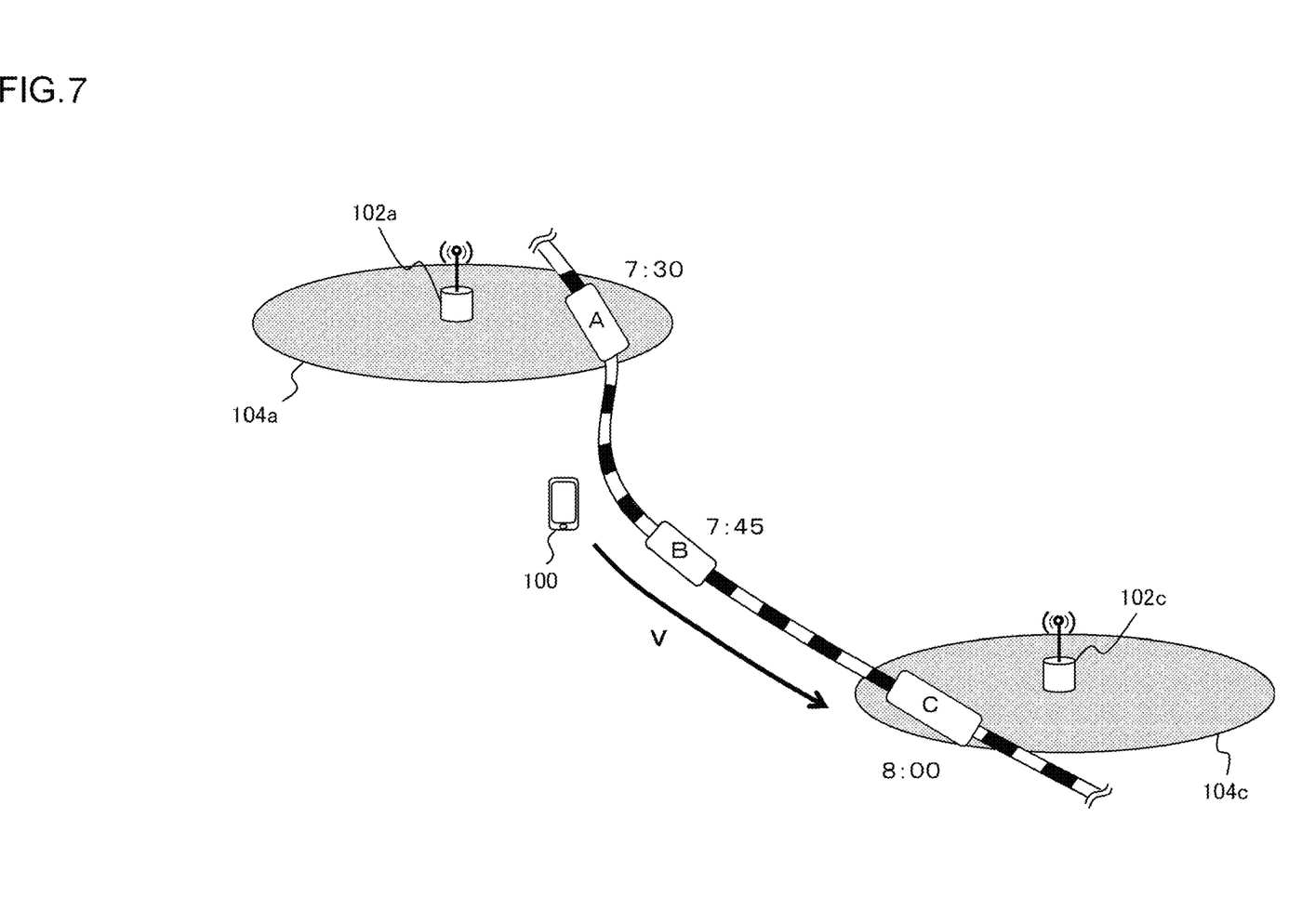
FIG. 7 is a diagram for describing an example of motion prediction and slicing control according to the present embodiment.

FIG. 7 is a diagram for describing an example of motion prediction and slicing control. In this example, it is assumed that the user carrying the terminal 100 gets on a train at a station A, passes through a station B, and gets off the train at a station C. As described above, the movement information acquirer 60 determines that the user is on a train and a route of the train from the position information on the terminal 100, the railroad map, the map information, or the like. Further, the motion predictor 62 determines a passage time of the terminal 100 on the route and a time of arrival at each of the stations B, C on the basis of a velocity v of the terminal 100 and a timetable of the train.

For example, the terminal 100 at the station A at 7:30 is predicted to arrive at the station B at 7:45 and then arrive at the station C at 8:00. When the terminal 100 is at the station A, the terminal 100 is present in a cell 104a and is connected to the base station 102a. At this time or after the train pulls away, when it is found that the train arrives at the station C at 8:00, the resource controller 64 confirms a resource allocation to the base station 102c having a cell 104c covering the station C. Then, before 8:00, preparation such as setting aside a resource for connecting the terminal 100 to the base station 102c is made.

In the illustrated example, the preparation for the connection to the base station 102c is made with attention paid to the station C that is an arrival station, but a handover to a neighboring cell may be sequentially performed between the station A and the station C. As with the above, the movement route and the passage time of the terminal 100 can be predicted, so that setting aside a resource to be allocated to the base station covering each cell allows the terminal 100 to use a service at all times with a high-quality signal. Note that, for a service that does not require a communication connection via the base station 102 while in transit, the connection destination may be switched in an area between the base stations 102a and 102b having their respective cells spaced apart from each other as illustrated in FIG. 7.

Figure 8:
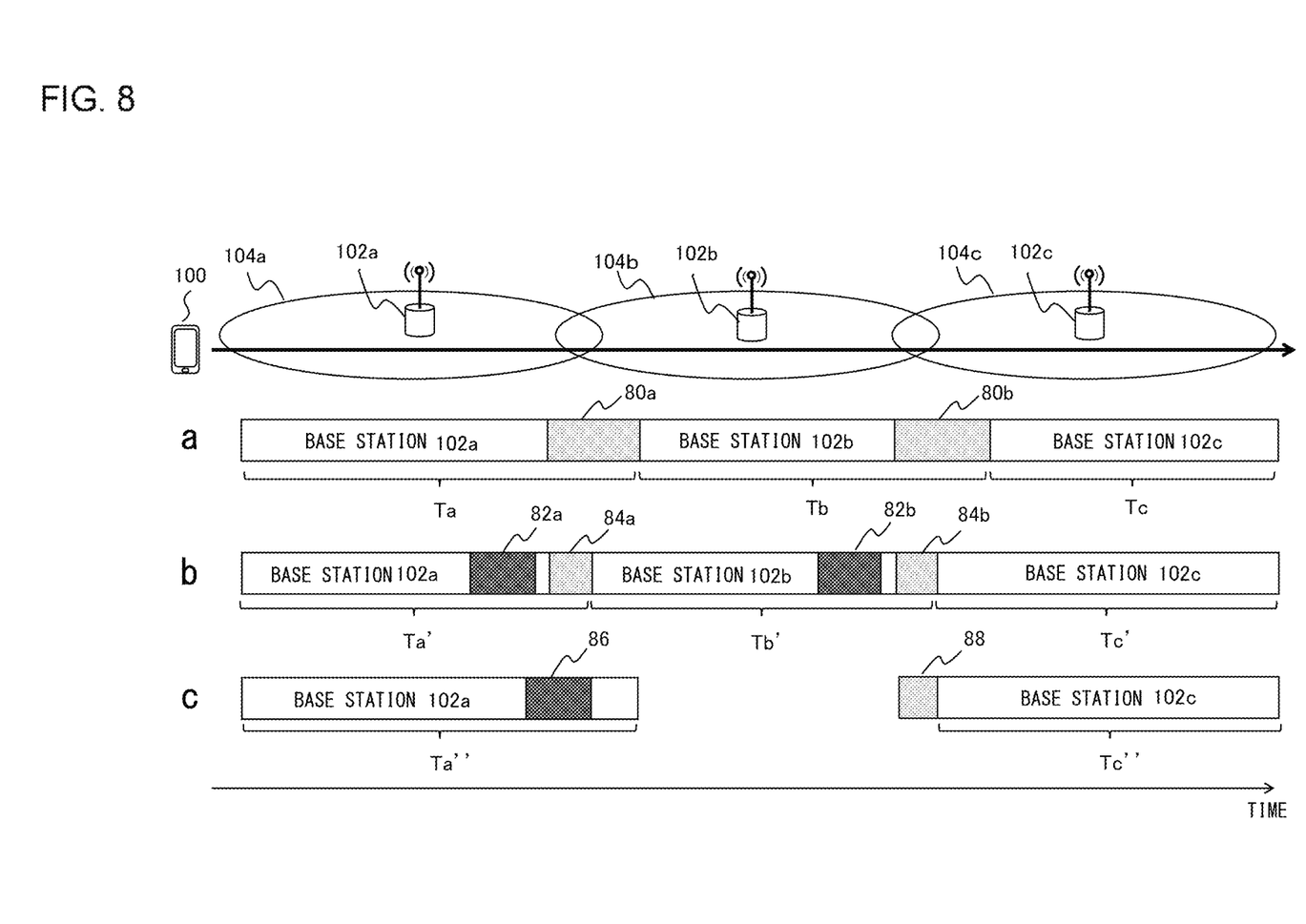
FIG. 8 is a diagram for comparing timing for preparation for switching between base stations and timing for switching between the base stations according to the present embodiment.

FIG. 8 is a diagram for comparing timing for preparation for switching between base stations and timing for switching between the base stations. As illustrated in the uppermost part, it is assumed that the terminal 100 moves, as indicated by an arrow, in the order of the neighboring cells 104a, 104b, 104c corresponding to the base stations 102a, 102b, 102c, respectively. (a), (b) and (c) each represent a period during which the terminal 100 is connected to each of the base stations 102a, 102b, 102c represented by a rectangle, with a lapse of time synchronized with the movement of the terminal 100 as a horizontal axis.

Among them, (a) shows a typical handover case as illustrated in FIG. 4. That is, the terminal 100 connected to the base station 102a over a period Ta switches the connection destination to the base station 102*b* from which the terminal 100 can receive a signal of higher quality on the basis of a result of scanning. In FIG. 8, a period 80*a* required for the switching is shaded. Further, a handover to the next base station 102*c* is performed in accordance with a result of scanning that is performed in a period Tb over which the terminal 100 is connected to the base station 102*b* after switching. As with the above, a connection period Tc over which the terminal 100 is connected to the base station 102*c* starts after the switching processing in a period 80*b*.

(b) shows a case where the preparation for switching is performed in advance on the basis of the predicted motion of the terminal 100 according to the present embodiment. As with the above, the terminal 100 is first connected to the base station 102*a* over a period Ta'. On the other hand, according to the present embodiment, even when the connection destination is switched to the base station 102*b* on the basis of a result of scanning, necessary and possible preparation processing such as setting aside a resource can be performed before switching. In FIG. 8, a preparation period 82*a* is shaded in a pattern different from a pattern of a period 84*a* that is required for actual switching.

Further, in this case, performing a part of the processing necessary for switching in advance increases the possibility that the period 84*a* required for switching can be made shorter than the case (a). This allows stable communications using the base station 102*b* after switching to start earlier than the case (a). In a period Tb' over which the terminal 100 is connected to the base station 102*b* after switching, a preparation period 82*b* for switching is provided in the same manner before actual switching to the next base station 102*c*.

Further, a period 84*b* required for actual switching is made shorter so as to cause a period Tc' corresponding to stable communications using the base station 102*c* to start earlier. Note that, in the case (a), for example, in the switching processing in the period 80*a*, when a necessary resource cannot be set aside, an attempt to make a connection to a base station different from the nearest base station 102*b* is made. This may make the switching time longer or may force communications to be performed using a signal of low quality. On the other hand, in the case (b), a period in which a resource is set aside in advance is provided, so that the possibility that a connection to the optimal base station 102*b* can be made becomes higher.

Note that the preparation periods 82*a*, 82*b* may be provided immediately before actual switching processing as illustrated in FIG. 8, or at any timing before actual switching processing. Alternatively, with no preparation period provided for each switching processing, preparations for switching to the plurality of base stations may be collectively performed at any desired timing such as when the motion can be predicted. In this case, subsequently, the acquisition of the movement information and the motion prediction may be continuously performed, and the resource once set aside may be further increased or freed in a manner that depends on a change in the prediction result to correct the preparation status, as necessary.

(c) shows a case where the movement of the terminal 100 to a non-neighboring cell is predicted, and then the preparation for switching is performed according to the present embodiment. As with the above, the terminal 100 is first connected to the base station 102*a* over a period Ta". Further, as in the case (b), a preparation period 86 for switching between base stations is provided in the period Ta". The switching destination, however, is the base station 102*c* corresponding to the cell 104*c* that is not adjacent to the cell 104*a* in which the terminal 100 is present.

When the cell manager 56 adds the cell 104*c* to the neighbor cell list and a quality of a signal from the base station 102*c* satisfies a predetermined criterion, an actual connection to the base station 102*c* is made. As in the case (b), setting aside a resource in advance makes the possibility of the connection to the base station 102*c* higher. Further, when a part of the processing necessary for switching is performed in advance, a period 88 required for switching can be made shorter, and a period Tc" over which the communications using the base station 102*c* are made can start earlier accordingly.

Figure 9:
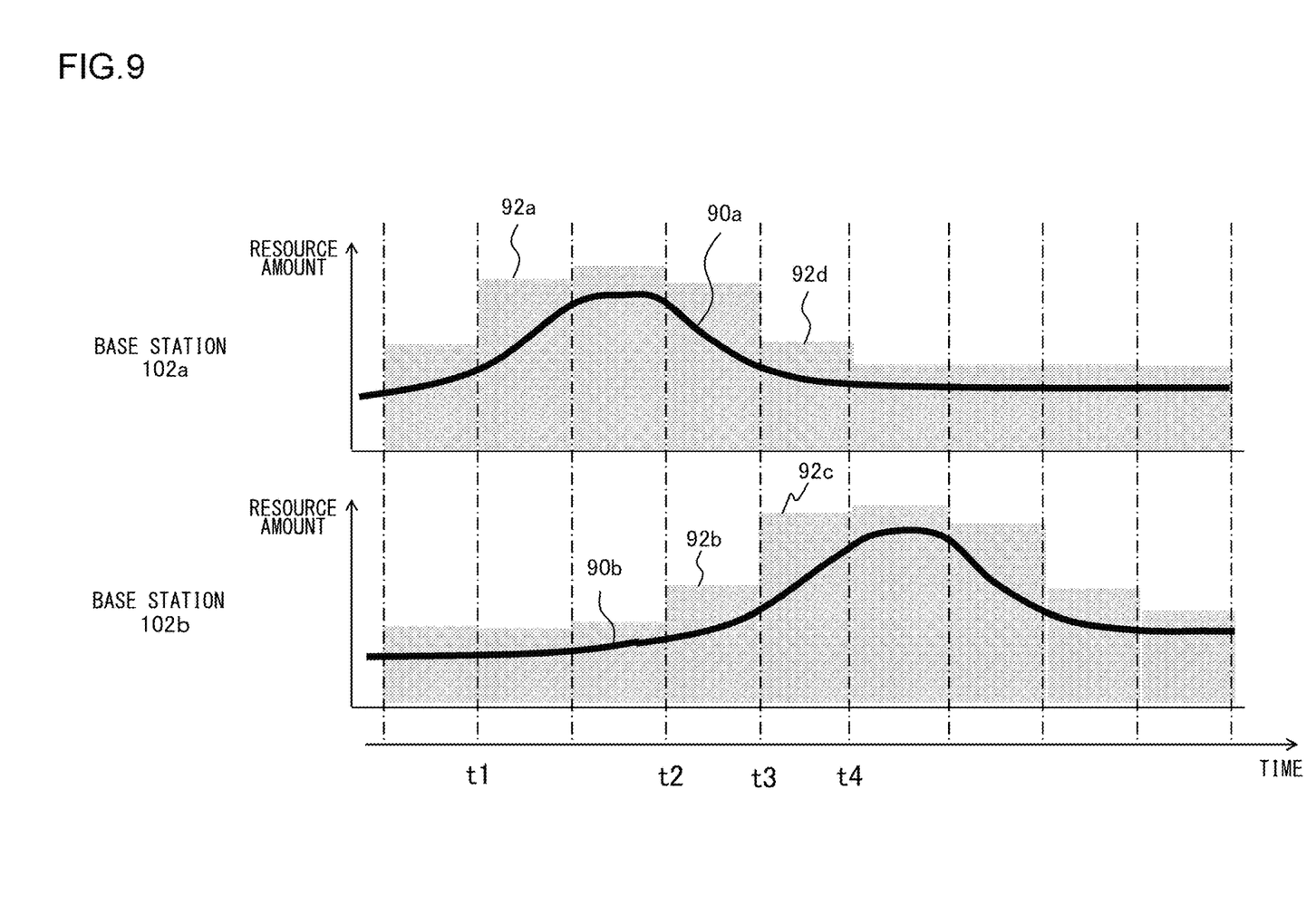
FIG. 9 is a diagram illustrating changes with time in resource amount consumed by base stations and in resource amount allocated to the base stations according to the present embodiment.

FIG. 9 illustrates changes with time in resource amount consumed by the base stations and in resource amount allocated to the base stations. In FIG. 9, changes in resource amount consumed by the base stations 102*a*, 102*b* having their respective cells adjacent to each other are represented by a thick line, and changes in resource amount allocated by the resource controller 64 are represented by a height of a shaded region with respect to a common horizontal time axis. Although the allocated resource amount is assumed to be corrected every period represented by a long dashed short dashed line, the present embodiment is not limited to such a configuration.

First, a consumed resource amount 90*a* for the base station 102*a* corresponds to, for example, a state where the number of users using the same service suddenly increases from a time t1 to a time t2. The motion predictor 62 of the slicing control device 50 can predict such a change in advance by predicting the motion of each terminal 100. This allows the resource controller 64 to allocate a large amount of resources (for example, an allocated resource amount 92*a*) to the base station 102*a*, for example, at the time t1 before the actual sudden increase in the consumed resource amount.

Here, when a crowd of people in the cell of the base station 102*a* moves to the cell of the base station 102*b* all at once, for example, the consumed resource amount 90*a* for the base station 102*a* decreases from the time t2, and in contrast, a consumed resource amount 90*b* for the base station 102*b* suddenly increases until a time t4. As with the above, the resource controller 64 can allocate a large amount of resources (for example, allocated resource amounts 92*b*, 92*c*) to the base station 102*b*, for example, at the times t2, t3 before the actual sudden increase in the consumed resource amount.

The motion predictor 62 can also predict a decrease in the consumed resource amount for the base station 102*a* on the basis of the predicted motion of each terminal 100. On the basis of a result of the prediction, the resource controller 64 reduces the resource allocation, like an allocated resource 92*d*, to the base station 102*a* in synchronization with the decrease in the consumed resource amount. This increases the possibility that the allocated resource amount 92*c* for the base station 102*b* can be increased without delay or insufficiency.

Note that FIG. 9 illustrates a case where at least a certain amount of resources is always consumed at any base stations. On the other hand, according to the present embodiment, it is also possible to predict that the number of users of the service will become zero in a specific area on the basis of the movement information on the terminal 100. Therefore, for example, when it is predicted that a state where there is no user who uses the service in a certain cell continues for a predetermined period, the resource controller 64 may set the resource to be allocated to the base station for a corresponding network slice to zero. This allows an extra resource to be allocated to another base station and thus allows effective use of resources.

Figure 10:
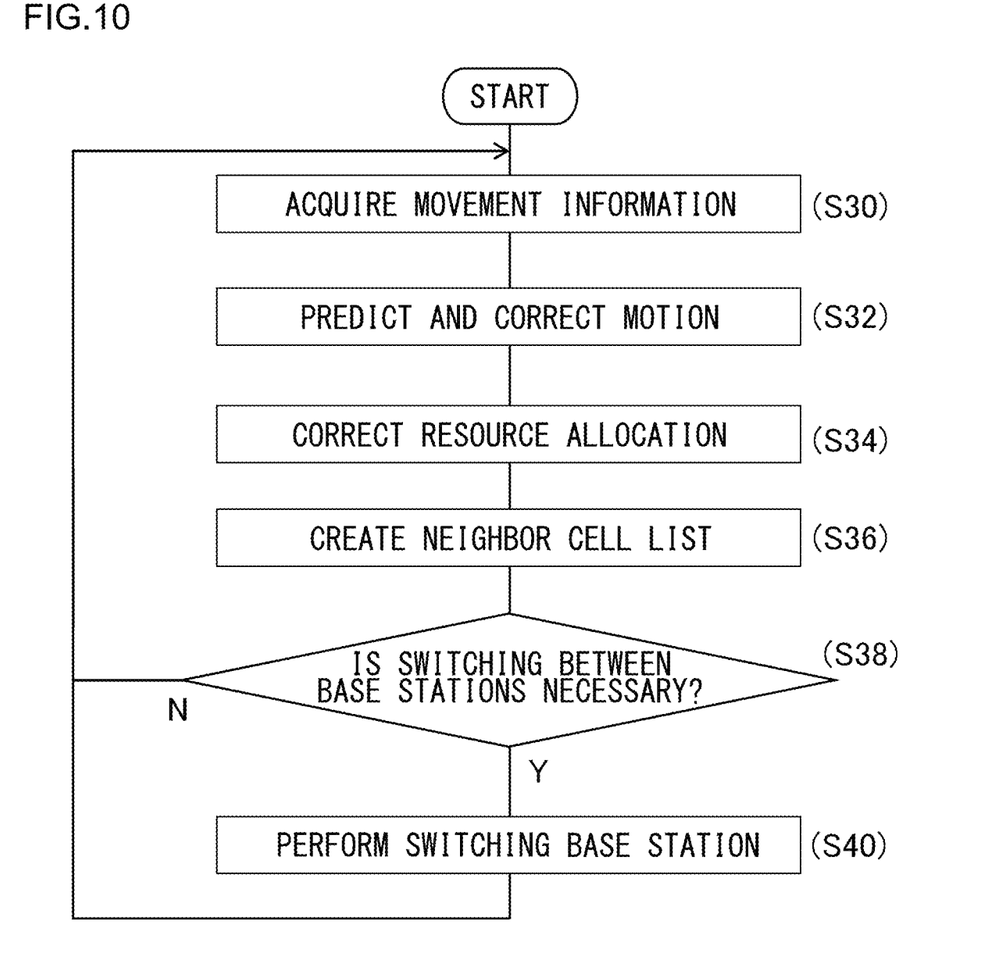
FIG. 10 is a flowchart illustrating a procedure of making a resource allocation and switching between base stations in response to motion of a terminal according to the embodiment.

Next, how the communication network that can be implemented by the above-described configuration operates will be described. FIG. 10 is a flowchart illustrating a procedure of making a resource allocation and switching between base stations in response to motion of the terminal 100. This flowchart starts under a condition where the terminal 100 uses a service provided, over a network slice, from a certain base station. Here, the consumed resource manager 52 of the slicing control device 50 manages a real-time consumed resource amount for each base station. Further, the terminal information manager 54 manages a network slice in use by the terminal 100.

In this state, the movement information acquirer 60 acquires at least one piece of movement information suggesting motion of the terminal 100 (S30). Note that the acquisition of the movement information is not limited to the illustrated timing, and may be performed continuously or only once in a manner that depends on the type of information. The motion predictor 62 predicts the motion of the terminal 100 on the basis of the movement information (S32). Here, the motion predictor 62 may predict changes in position relative at a plurality of times as a series of motion, or may predict a position at a certain time such as the time of arrival at a destination.

The resource controller 64 identifies a cell that is the movement destination or passing point of the terminal 100 on the basis of the cell information acquired by the cell manager 56, and estimates excess or deficiency in resource allocation to a corresponding base station 102 at a predicted time. Then, the resource controller 64 performs correct the resource allocation to the corresponding network slice as necessary (S34). Here, the "correction" processing includes correction of data, that is, correction of a scheduled resource allocation, and an actual adjustment to the resource. The resource controller 64 may perform both at different timings or in series. In any case, the resource controller 64 makes an allocation adjustment in accordance with the estimation at any timing before an increase or decrease in actually required resources.

Further, at this timing, a part of the processing necessary for switching between base stations may be performed. The resource controller 64 may request the RAN 10 or the CN 12 to perform the processing. On the other hand, the cell manager 56 creates a neighbor cell list containing a predicted destination cell, and transmits the neighbor cell list to the terminal 100 (S36). The movement information acquirer 60 continues to acquire the movement information as necessary until a determination is made that switching between base stations is necessary on the basis of, for example, detection, by the terminal 100, of a signal of high quality based on the neighbor cell list (N in S38, S30).

This increases the possibility that unexpected motion of the terminal 100 caused by a schedule change made by the user can be detected. In this case, the motion predictor 62 corrects the predicted motion (S32), and the resource controller 64 and the cell manager 56 correct, as necessary, the resource allocation and the neighbor cell list (S34, S36). When a determination is made that switching to a base station to which the terminal 100 is connected is necessary (Y in S38), switching to the base station is performed by cooperation of the terminal 100, the RAN 10, and the CN 12 (S40). The procedure illustrated in FIG. 4 can be applied to this processing. Repeatedly performing the same processing even after switching to the base station makes it possible to maintain the service available in a suitable environment regardless of the position of the terminal 100.

According to the present embodiment described above, the device that controls the network slice collects various kinds of movement information suggesting the motion of the terminal 100 and predicts the motion. On the basis of the predicted motion, the resource amount to be consumed in each base station is estimated and set aside in advance, or an actual adjustment to the resource allocation is made. This makes it possible to prevent, when the terminal 100 actually switches the base station, the quality of service from deteriorating due to a resource shortage.

Further, a sudden increase or decrease in the number of terminals 100 in a cell is predicted, and an adjustment to the resource allocation is made in advance. This makes it possible to minimize, under a condition where a resource shortage is likely to occur, such as when an event is held, rush hours, or the occurrence of a disaster, difficulty in connecting to the network. Furthermore, resources can be freed with high accuracy due to a decrease in consumption, thereby allowing efficient operation by, for example, increasing an allocation to another base station. Further, when a part of the processing necessary for the switching between base stations is performed in advance on the basis of the predicted motion, it is possible to simplify the actual switching processing and to make a service using a more stable signal available earlier.

The present invention has been described on the basis of the embodiment. It is to be understood by those skilled in the art that the embodiment is illustrative and that various modifications are possible for a combination of components or processes, and that such modifications are also within the scope of the present invention.

INDUSTRIAL APPLICABILITY

As described above, the present invention is applicable to various systems that provide network services in a control device of such a system, a device that supports management of such a system, and the like.

REFERENCE SIGNS LIST

10 RAN, 12 CN, 16 network operating system, 32 application server, 50 slicing control device, 52 consumed resource manager, 54 terminal information manager, 56 cell manager, 58 cell information storage, 60 movement information acquirer, 62 motion predictor, 64 resource controller

The invention claimed is:
1. A network operating system for controlling a virtual network over which mobile communications are implemented, the network operating system comprising:
one or more processors comprising hardware, wherein the one or more processors are configured to implement:
a motion predictor structured to predict motion of a terminal on the basis of movement information suggesting the motion, wherein the movement information comprises at least one of reservation information, and the reservation information includes an arrival location and an estimated time of arrival; and
a resource controller structured to control a resource allocation to a radio base station on the virtual network in accordance with a result of predicting the motion.

2. The network operating system according to claim 1, wherein the resource controller performs, before an inter-cell handover triggered by movement of the terminal, a part of processing necessary for the inter-cell handover.

3. The network operating system according to claim 1, wherein the resource controller sets aside a resource necessary for a radio base station of a connection destination before an inter-cell handover triggered by movement of the terminal.

4. The network operating system according to claim 1, wherein
the motion predictor predicts a time of arrival at a cell spaced apart from a cell in which the terminal is present, and
the resource controller sets aside a resource necessary for a corresponding radio base station before the time of arrival.

5. The network operating system according to claim 1, wherein the movement information is obtained from at least one of the terminal, an application server in use by the terminal or used by the terminal in the past, or a server that provides place information.

6. The network operating system according to claim 1, wherein
the movement information comprises reservation information for a user of the terminal.

7. The network operating system according to claim 1, wherein the reservation information comprises at least one of a reservation of public transportation, details of retrieval of information on a means of transportation, or details of input to an application provided by a facility external to the terminal.

8. The network operating system according to claim 1, wherein the resource controller identifies a network slice in use by the terminal whose motion has been predicted, and controls the resource allocation included in the network slice.

9. The network operating system according to claim 1, wherein the resource controller estimates a consumed resource amount for each radio base station on the basis of the result of predicting the motion of a plurality of the terminals, and increases or decreases the resource allocation in accordance with an increase or decrease in the consumed resource amount.

10. A network management method applied to a system for controlling a virtual network over which mobile communications are implemented, the network management method comprising:
predicting motion of a terminal on the basis of movement information suggesting the motion, wherein the movement information comprises at least one of reservation information, and the reservation information includes an arrival location and an estimated time of arrival; and
controlling a resource allocation to a radio base station on the virtual network in accordance with a result of predicting the motion.

11. A non-transitory computer-readable recording medium storing a program for causing a computer for controlling a virtual network over which mobile communications are implemented to execute processing comprising:
predicting motion of a terminal on the basis of movement information suggesting the motion, wherein the movement information comprises at least one of reservation information, and the reservation information includes an arrival location and an estimated time of arrival; and
controlling a resource allocation to a radio base station on the virtual network in accordance with a result of predicting the motion.

12. The network operating system according to claim 1, wherein the reservation information comprises at least one of a reservation of public transportation, details of retrieval of information on a means of transportation, or details of input to an application provided by a facility external to the terminal.

13. The network operating system according to claim 1, wherein the reservation information comprises a railroad map.

14. The network operating system according to claim 1, wherein the movement information further comprises weather information, disaster information, or public event information.

15. The network operating method according to claim 10, wherein the reservation information comprises at least one of a reservation of public transportation, details of retrieval of information on a means of transportation, or details of input to an application provided by a facility external to the terminal.

16. The network operating method according to claim 10, wherein the reservation information comprises a railroad map.

17. The network operating method according to claim 10, wherein the movement information further comprises weather information, disaster information, or public event information.

18. The non-transitory computer readable medium according to claim 11, wherein the reservation information comprises at least one of a reservation of public transportation, details of retrieval of information on a means of transportation, or details of input to an application provided by a facility external to the terminal.

19. The non-transitory computer readable medium according to claim 11, wherein the reservation information comprises a railroad map.

20. The non-transitory computer readable medium according to claim 11, wherein the movement information further comprises weather information, disaster information, or public event information.

* * * * *